(12) United States Patent
Nomura

(10) Patent No.: US 8,762,863 B2
(45) Date of Patent: Jun. 24, 2014

(54) METHOD AND APPARATUS FOR GESTURE MANIPULATION ACROSS MULTIPLE DEVICES

(75) Inventor: Eisuke Nomura, Tokyo (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 13/043,194

(22) Filed: Mar. 8, 2011

(65) Prior Publication Data

US 2011/0231783 A1  Sep. 22, 2011

(30) Foreign Application Priority Data

Mar. 17, 2010  (JP) ................ P2010-061126

(51) Int. Cl.
*G06F 3/00* (2006.01)

(52) U.S. Cl.
USPC ............. 715/761; 345/158; 345/1.1; 345/1.3

(58) Field of Classification Search
USPC ............... 715/761; 345/158, 1.1, 1.3
See application file for complete search history.

(56) References Cited

U.S. PATENT DOCUMENTS

| | | | |
|---|---|---|---|
| 6,118,433 A * | 9/2000 | Jenkin et al. ................. | 345/173 |
| 6,470,341 B1 | 10/2002 | Rekimoto | |
| 7,409,231 B2 | 8/2008 | Oba et al. | |
| 7,430,721 B2 * | 9/2008 | Johanson et al. ............. | 715/761 |
| 7,453,418 B2 * | 11/2008 | Palmquist ..................... | 345/1.1 |
| 7,525,511 B2 * | 4/2009 | Baudisch ....................... | 345/1.3 |
| 2004/0125044 A1 | 7/2004 | Suzuki | |
| 2005/0093868 A1 * | 5/2005 | Hinckley ...................... | 345/502 |
| 2005/0259084 A1 * | 11/2005 | Popovich et al. ............. | 345/173 |
| 2007/0146347 A1 * | 6/2007 | Rosenberg .................... | 345/173 |
| 2008/0216125 A1 * | 9/2008 | Li et al. ........................... | 725/62 |
| 2009/0140986 A1 * | 6/2009 | Karkkainen et al. .......... | 345/173 |
| 2010/0058205 A1 * | 3/2010 | Vakil et al. ..................... | 715/761 |
| 2010/0079355 A1 * | 4/2010 | Kilpatrick et al. ............. | 345/1.3 |
| 2011/0012856 A1 * | 1/2011 | Maxwell et al. .............. | 345/173 |
| 2012/0144347 A1 * | 6/2012 | Jo et al. .......................... | 715/863 |

FOREIGN PATENT DOCUMENTS

| | | |
|---|---|---|
| JP | 2005-099064 | 4/2005 |
| JP | 3900605 | 1/2007 |
| JP | 4164758 | 8/2008 |

* cited by examiner

*Primary Examiner* — Kieu Vu
*Assistant Examiner* — Andrew Chung
(74) *Attorney, Agent, or Firm* — Sherr & Jiang, PLLC

(57) ABSTRACT

There is provided an information processing apparatus including a detection unit for detecting operation performed with a manipulating object on a display screen to connect to one or more apparatuses, and a determining unit for determining a relative orientation of another apparatus to which the information processing apparatus connects, based on the operation of the manipulating object detected by the detection unit.

20 Claims, 17 Drawing Sheets

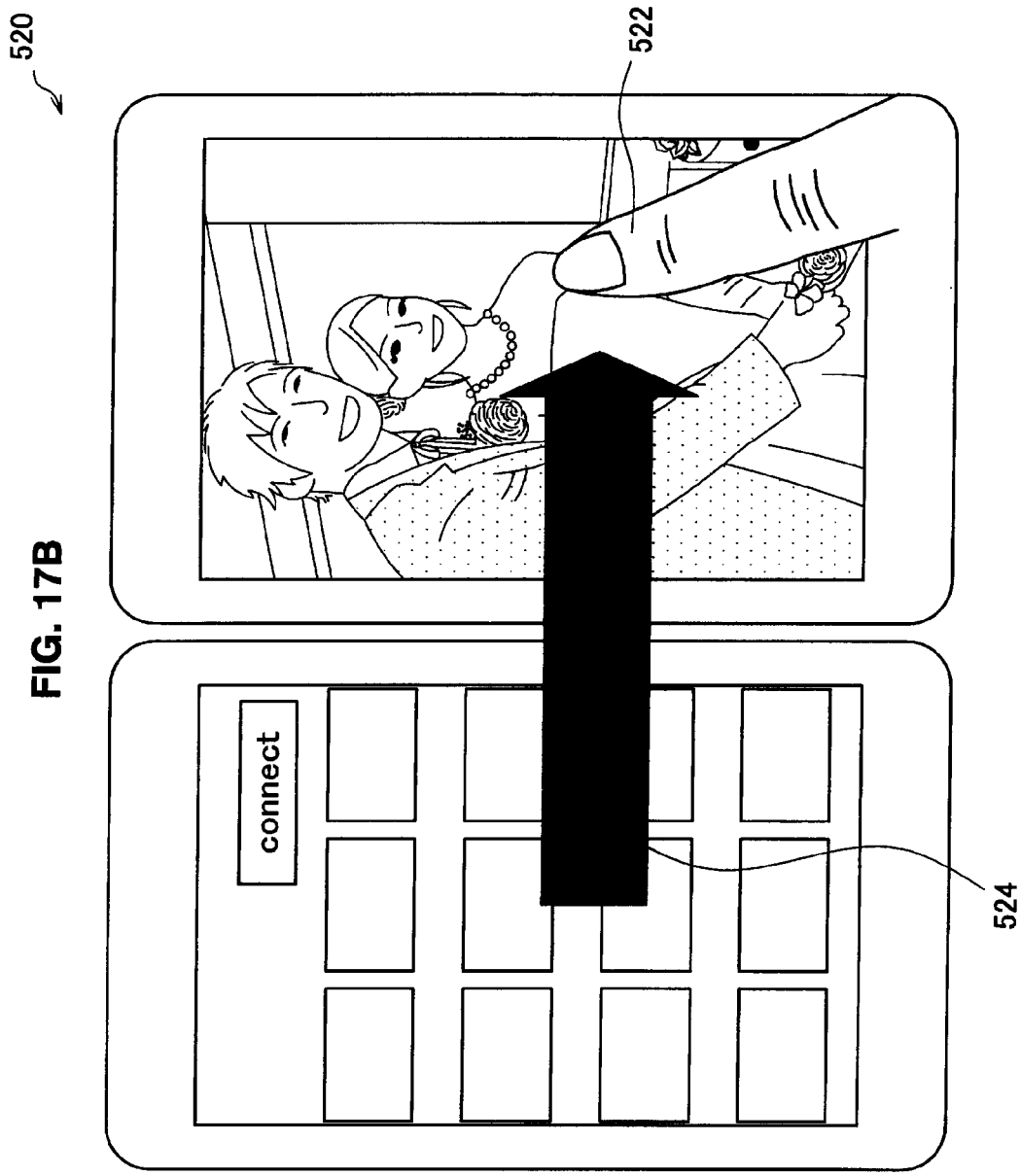

FIG. 18A
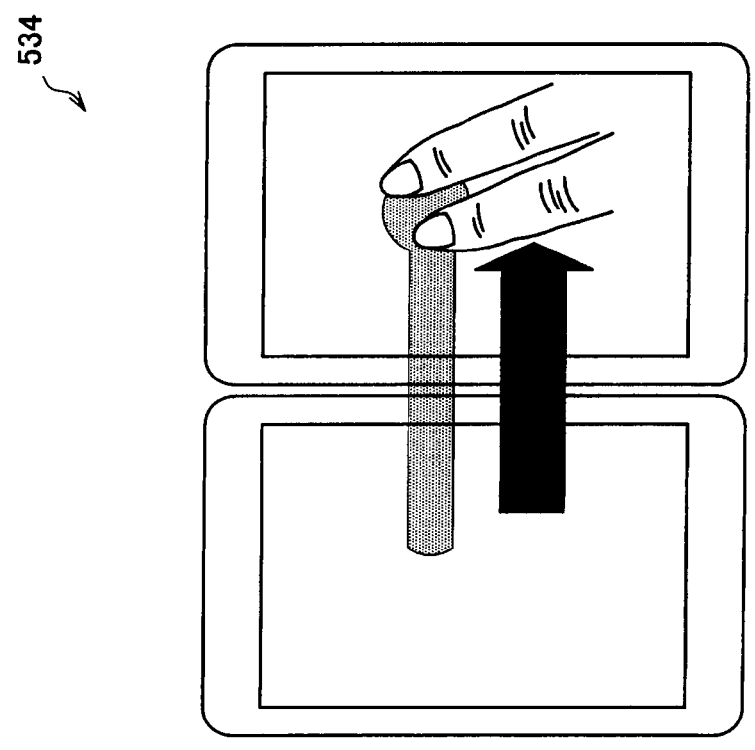
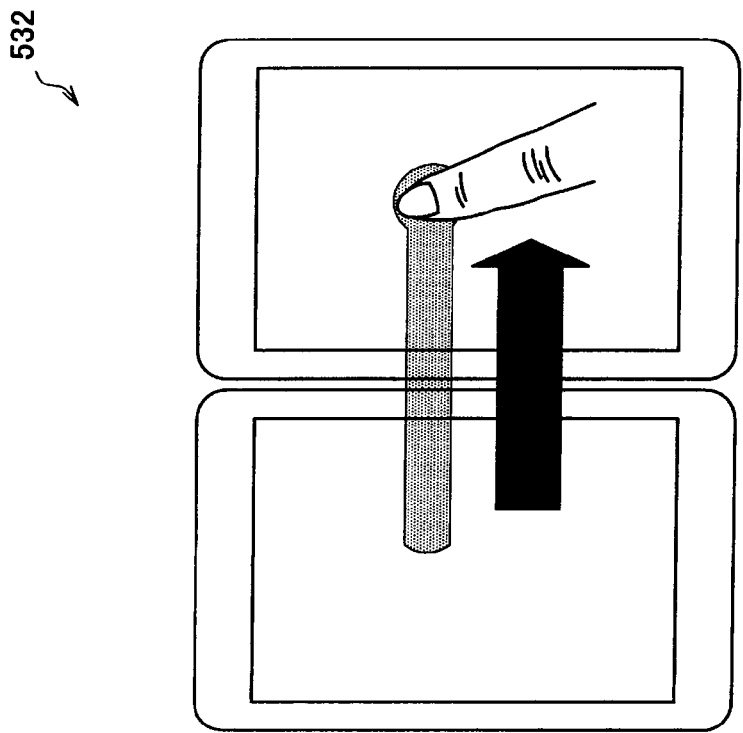

FIG. 18B
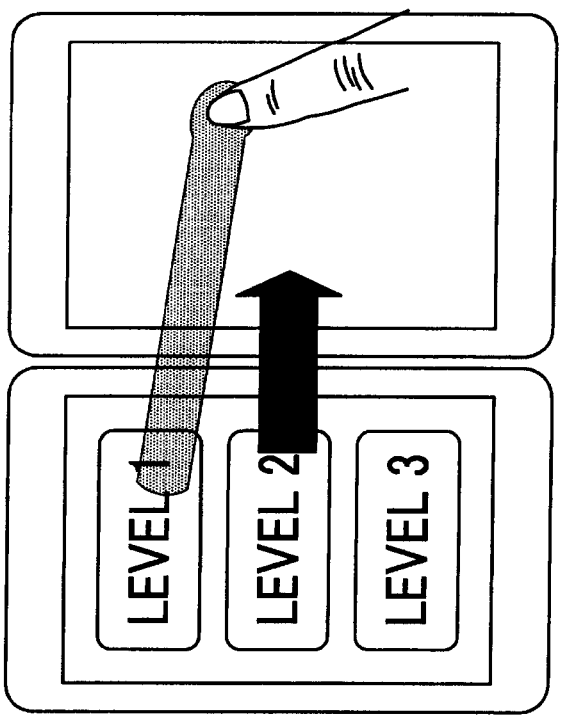
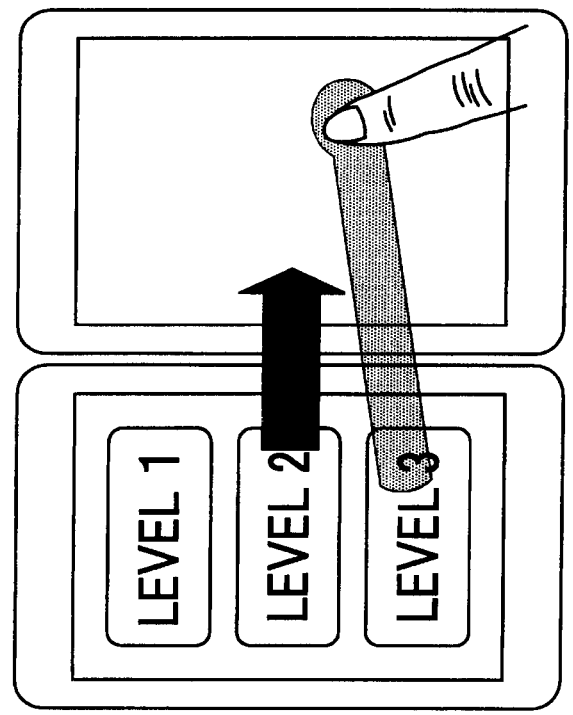

METHOD AND APPARATUS FOR GESTURE MANIPULATION ACROSS MULTIPLE DEVICES

BACKGROUND OF THE INVENTION

1. Field of the Invention

The present invention relates to an information processing apparatus and an information processing method, and more particularly to an information processing apparatus, an information processing method, and a program capable of connecting to a plurality of apparatuses with intuitive operation.

2. Description of the Related Art

Wireless LAN such as Wi-Fi, Bluetooth (registered trademark), and short-range wireless communication have become widely present these days. Accordingly, multicast data transfer to multiple terminals and selective data transfer from multiple terminals are desired in data transfer between terminals. In order to communicate/connect with multiple terminals and transfer data to multiple terminals, it is necessary to select each terminal with which connection is made and to which data are transferred. In order to establish connection when multiple terminals are linked with each other, a user has to understand the name, the identification number, and the like designating each terminal. Therefore, there is an issue in that the user is not capable of performing communication/connection and data transfer with intuitive operation. Moreover, there is an issue in that, when data are transferred, it is difficult to understand which terminal transfers data to which terminal and how the data are transferred.

Japanese Patent No. 4164758, Japanese Patent No. 3900605, and Japanese Patent Application Laid-Open No. 2005-99064 disclose techniques for achieving connection and transfer with intuitive operation. For example, terminals are bumped together to establish connection and transfer data, and an orientation of a terminal is virtually displayed and a transfer object is flicked in that direction. In addition, a technique for obtaining directionality of data transfer by using a sensor for detecting an arrangement of terminals is also disclosed.

SUMMARY OF THE INVENTION

However, there is an issue in that the technique for achieving connection and transfer by bumping the terminals together can only be applied to one-to-one communication between two terminals, and in a case where only the orientation of the terminal is virtually displayed, a user is not capable of understanding actual arrangement of the terminals. Accordingly, it is desired to allow a user to identify an apparatus with which connection is made and to which data are transferred, using only intuitive operation without relying on a sensor for detecting an arrangement of terminals.

In view of the foregoing, it is desirable to provide a novel and improved information processing apparatus and information processing method, wherein a user can understand, with intuitive operation, relationship of adjacency between the information processing apparatus and another apparatus with which the information processing apparatus communicates.

According to an embodiment of the present invention, there is provided an information processing apparatus including a detection unit for detecting operation performed with a manipulating object on a display screen to connect to one or more apparatuses, and a determining unit for determining a relative orientation of another apparatus to which the information processing apparatus connects, based on the operation of the manipulating object detected by the detection unit.

The determining unit may determine a relative arrangement with respect to the another apparatus for establishing a connection with the another apparatus, based on the operation of the manipulating object detected by the detection unit.

The detection unit may detect a trail input to the display screen according to the operation of the manipulating object.

The information processing apparatus may further include an obtaining unit for obtaining trail data representing the trail of operation of the manipulating object detected by the another apparatus and the information processing apparatus.

The information processing apparatus may further include a storage unit for storing the trail data obtained by the obtaining unit.

The determining unit may arrange the trail data stored in the storage unit in an order of time, and determine whether the storage unit stores data of the another apparatus to which the information processing apparatus connects.

The detection unit may detect an input start region from which input is started and an input end region at which the input is finished, the input being performed with the manipulating object onto the display screen.

The detection unit may detect an input start time when input is started and an input end time when the input is finished, the input being performed with the manipulating object onto the display screen.

The obtaining unit may obtain trail start data including the input start region and the input start time and the trail end data including the input end region and the input end time, the trail start data and the trail end data being detected by the information processing apparatus and the another apparatus to which the information processing apparatus connects.

The storage unit may store the trail start data and the trail end data obtained by the obtaining unit.

In a case where the number of apparatuses to which the information processing apparatus connects is already known, the determining unit may make a determination as follows: in the trail start data and the trail end data sorted in an order of time, when the trail end region of the trail end data stored at an order equivalent to the number of apparatuses is determined to be a region representing an end of the trail input performed with the manipulating object, and when the number of pieces of stored data corresponds to the number of apparatuses, the determining unit determines that the trail start data and the trail end data are data representing a relative orientation with respect to the another apparatus to which the information processing apparatus connects.

In a case where the number of apparatuses to which the information processing apparatus connects is unknown, the determining unit may make a determination as follows: in the trail start data and the trail end data sorted in an order of time, a time difference between an input start time of a predetermined terminal and an input end time of another terminal is calculated, and when a time difference between the input start time of the predetermined terminal and another input end time whose data are located adjacently is determined to be a minimum, and the time difference is equal to or less than a predetermined threshold value, the determining unit determines that the trail start data and the trail end data are data representing a relative orientation with respect to the another apparatus to which the information processing apparatus connects, in a case where the trail end region of the trail end data stored at the last is a region representing an end of the trail input performed with the manipulating object.

The detection unit may use a touch panel of a capacitance method or an infrared method to detect operation performed with the manipulating object on the information processing apparatus.

According to another embodiment of the present invention, there is provided a program for causing a computer to function as an information processing apparatus including a detection unit for detecting operation performed with a manipulating object on a display screen to connect to one or more apparatuses, and a determining unit for determining a relative orientation of another apparatus to which the information processing apparatus connects, based on the operation of the manipulating object detected by the detection unit.

In addition, according to another embodiment of the present invention, there is provided an information processing method comprising the steps of detecting operation performed with a manipulating object on a display screen to connect to one or more apparatuses, and determining a relative orientation of another apparatus to which the information processing apparatus connects, based on the operation of the manipulating object detected.

As described above, according to the present invention, a user can understand, with intuitive operation, relationship of adjacency between the information processing apparatus and another apparatus with which the information processing apparatus communicates.

BRIEF DESCRIPTION OF THE DRAWINGS

FIG. 17B is an explanatory diagram illustrating data transmission/reception according to the embodiment;

FIG. 18A is an explanatory diagram for explaining an input of selection of a connection level according to the embodiment; and FIG. 18B is an explanatory diagram for explaining an input of selection of a connection level according to the embodiment.

DETAILED DESCRIPTION OF THE EMBODIMENTS

Figure 1:
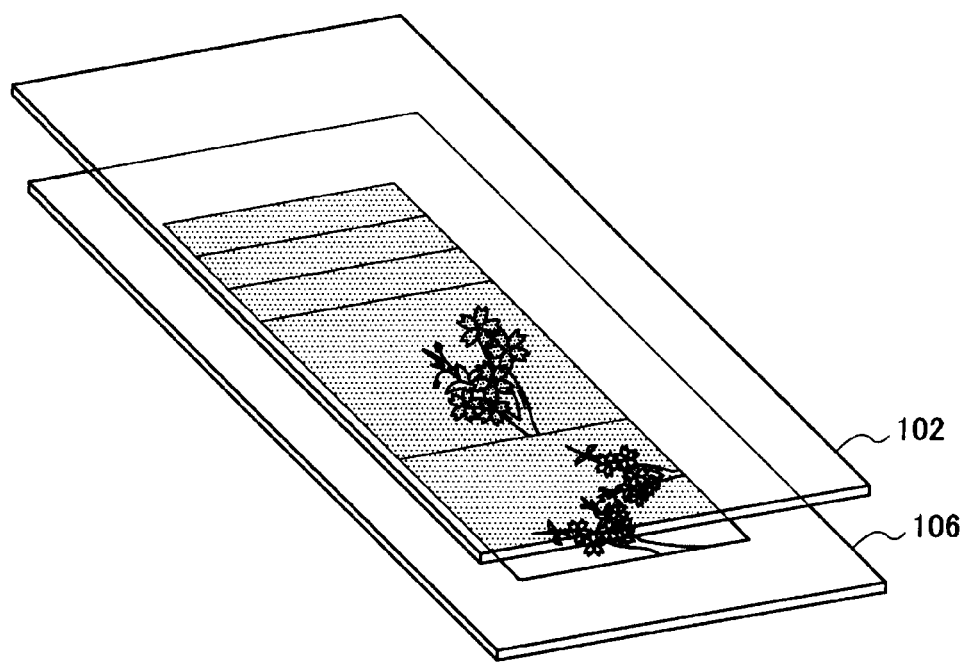
FIG. 1 is an explanatory diagram illustrating a configuration of a display device of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The detailed description of the embodiments will be explained in the order listed below.
<1. Purpose of the present embodiment>
<2. Hardware configuration of information processing apparatus>
<3. Functional configuration of information processing apparatus>
<4. Detailed operation of information processing apparatus>

1. Purpose of the Present Embodiment

First, the purpose of the embodiment of the present invention will be explained. Wireless LAN such as Wi-Fi, Bluetooth (registered trademark), and short-range wireless communication have become widely present these days. Accordingly, multicast data transfer to multiple terminals and selective data transfer from multiple terminals are desired in data transfer between terminals. In order to communicate/connect with multiple terminals and transfer data to multiple terminals, it is necessary to select each terminal with which connection is made and to which data are transferred. In order to establish connection when multiple terminals are linked with each other, a user has to understand the name, the identification number, and the like designating each terminal. Therefore, there is an issue in that the user is not capable of performing communication/connection and data transfer with intuitive operation.

In infrared communication and the like, each of a transfer source terminal and a transfer destination terminal displays a progress bar representing only the size of transmitted/received data. However, directionality of data transfer between the terminals is not shown. When more terminals are connected, and data are frequently transmitted/received, there is an issue in that it is difficult to understand which terminal transfers data to which terminal and how the data are transferred during data transfer.

In a Bump (registered trademark), terminals are bumped together to make connection and perform transfer. In the Bump, connection and data transfer are achieved by an intuitive interaction, i.e., bumping together the terminals held by hands in a one-to-one communication. However, in the Bump (registered trademark), it is difficult to perform one-to-multiple communication. On the other hand, a technique has been disclosed, in which a direction of a terminal is virtually displayed, and connection and transfer can be achieved by an intuitive operation, i.e., flicking a transfer object in that direction. Another technique has been disclosed, in which a sensor for detecting an arrangement of terminals is used to obtain directionality of data transfer.

However, as described above, there is an issue in that the technique for achieving connection and transfer by bumping the terminals together can only be applied to one-to-one communication between two terminals, and in a case where only the orientation of the terminal is virtually displayed, a user is not capable of understanding actual arrangement of the terminals. Accordingly, it is desired to allow a user to identify an apparatus with which connection is made and to which data are transferred, using only intuitive operation without relying on a sensor for detecting an arrangement of terminals. Accordingly, an information processing apparatus 10 according to an embodiment of the present invention has been created in view of the above circumstance as one of issues taken into consideration. According to the information processing apparatus 10 of the present embodiment, a user can understand, with intuitive operation, relationship of adjacency between the information processing apparatus 10 and another apparatus with which the information processing apparatus 10 communicates.

In the present embodiment, the information processing apparatus 10 will be explained using examples of a small audio player, a media player, a PDA (personal digital assistant), a portable telephone, and the like. However, the present embodiment is not limited thereto. The present embodiment can also be applied to a personal computer and the like. In the present embodiment, the information processing apparatus 10 is formed integrally with a display device such as a display. However, the present embodiment is not limited thereto. The information processing apparatus 10 and the display device may be made as separate apparatuses.

2. Hardware Configuration of Information Processing Apparatus

The purpose of the embodiment of the present invention has been explained hereinabove. Subsequently, a configuration of a display device of the information processing apparatus 10 according to the present embodiment will be explained with reference to FIG. 1. FIG. 1 is an explanatory diagram illustrating the configuration of the display device of the information processing apparatus 10. The information processing apparatus 10 according to the present embodiment is an apparatus to which information can be input by bringing a manipulating object such as a finger into contact with or proximity to a display screen of the display device displaying information. A user who owns the information processing apparatus 10 brings the manipulating object into contact with a target represented by an icon, a character key, and the like displayed on the display device, thereby selecting/deciding the target touched by the manipulating object. The user can input a trail of a series of operation by causing the manipulating object to touch and move on the screen, and execute processing according to the trail.

As shown in FIG. 1, an input display unit of the information processing apparatus 10 is structured by arranging a touch panel 102 on the display screen of the display device 106. The touch panel 102 has two functions, i.e., display and input. The touch panel 102 according to the present embodiment can detect operation performed with the manipulating object such as a finger of the user, which is in proximity to or in contact with the touch panel 102. The detection method may be any method as long as position information of the manipulating object on the display can be detected. Examples of the detection methods include a resistive film method using a thin metallic film constituting a transparent electrode, a capacitive method for detecting a position by finding change of capacitance between a finger tip and a conductive film, an infrared light shielding method, and an electromagnetic induction method.

In the following explanation, for example, a method for detecting operation of the manipulating object using an electrostatic touch panel will be explained in particular. The electrostatic touch panel 102 has electrostatic sensors arranged in a matrix form. The values of the electrostatic sensors keep on changing according to changes of capacitances. When a finger, i.e., a manipulating object, comes into proximity to or contact with an electrostatic sensor, the capacitance detected by the electrostatic sensor increases. The capacitances of the electrostatic sensors can be obtained at a time. The electrostatic touch panel 102 detects and interpolates changes of capacitances of all the electrostatic sensors at a time, thereby detecting operation performed by a finger that is in proximity to or in contact with the electrostatic touch panel 102. The electrostatic touch panel 102 outputs the values of the detected capacitances to a CPU (Central Processing Unit having a reference numeral 101 in FIG. 2).

The CPU associates various kinds of information given by the electrostatic touch panel 102 with display positions of display contents displayed on the display device 106, and analyzes movement of the manipulating object. Then, the CPU recognizes input information given to the information processing apparatus 10 based on analyzed movement of the manipulating object, and executes processing corresponding to the input information. As described above, the user can manipulate the contents displayed on the display screen, and can input the input information. When the manipulating object is brought into contact with or pressed against the display screen of the display device 106, the manipulating object is not actually in contact with the display screen of the display device 106. Instead, the manipulating object is actually in contact with the surface of the electrostatic touch panel 102. Even though the manipulating object is actually in contact with the surface of the electrostatic touch panel 102, the manipulating object may be described as being "brought into contact with the display screen of the display device 106" in the explanation below.

Figure 2:
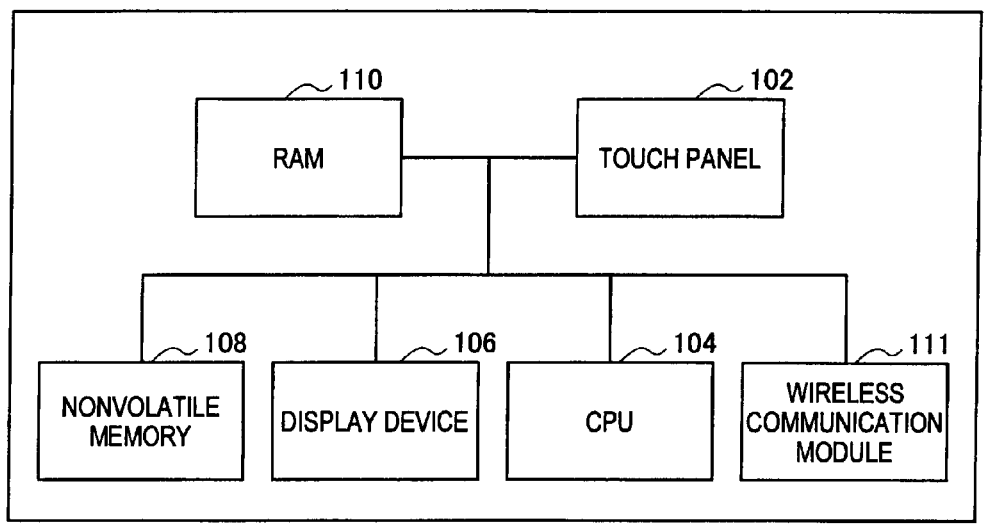
FIG. 2 is a block diagram illustrating a hardware configuration of an information processing apparatus according to the embodiment.

Subsequently, a hardware configuration of the information processing apparatus 10 will be explained with reference to FIG. 2. As shown in FIG. 2, the information processing apparatus 10 according to the present embodiment includes a touch panel 102, a CPU 104, a display device 106, a nonvolatile memory 108, and a RAM (Random Access Memory) 110.

As described above, the CPU 104 functions as a calculation processing unit and a control unit, and controls overall operation in the information processing apparatus 10 according to various kinds of programs. The CPU 104 may be a microprocessor. The RAM 110 temporarily stores programs used during execution of the CPU 104 and parameters and the like that change as necessary during the execution. These are connected with each other by a host bus constituted by a CPU bus and the like. The nonvolatile memory 108 stores, programs, calculation parameters, and the like used by the CPU 104. The nonvolatile memory 108 may be, for example, a ROM (Read Only Memory), a flash memory, and the like.

The display device 106 is an example of an output device for outputting information. The display device 106 may be, for example, a liquid crystal display (LCD) device, an OLED (Organic Light Emitting Diode) device, and the like. The electrostatic touch panel 102 is an example of an input device to which a user inputs information. The electrostatic touch panel 102 includes, for example, input means for inputting information and an input control circuit for generating an input signal based on user input and outputting the input signal to the CPU 104.

A user manipulates the electrostatic touch panel 102, thereby inputting various kinds of data to the information processing apparatus 10 and instructing processing operations. In the information processing apparatus 10 according to the present embodiment, the electrostatic touch panel 102 detects contact operation on a contact operation surface. A wireless communication module 111 is a communication interface constituted by a communication device and the like for connecting to a wireless communication network. The information processing apparatus 10 makes a Bluetooth (registered trademark) connection with another apparatus via the wireless communication module 111, and wirelessly communicates with another apparatus by means of Wi-Fi, short-range wireless communication, and the like.

3. Functional Configuration of Information Processing Apparatus

Figure 3:
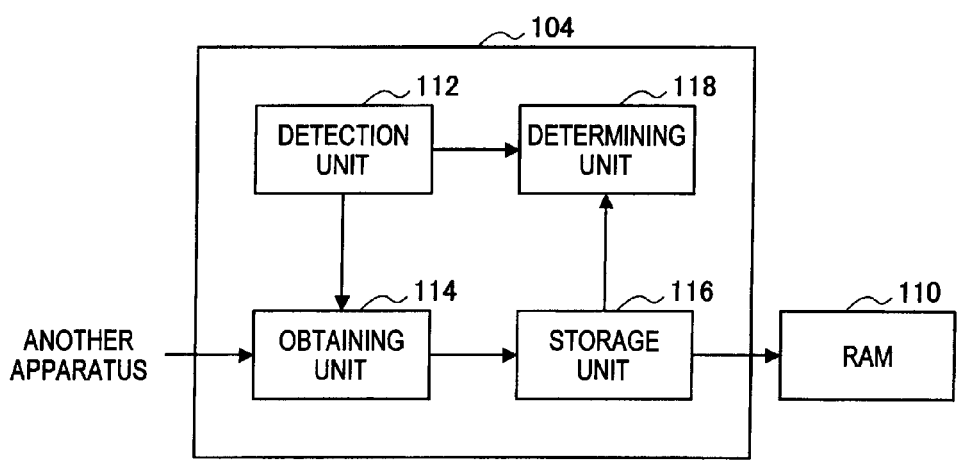
FIG. 3 is a block diagram illustrating a functional configuration of a control unit of an information processing apparatus according to the embodiment.

The hardware configuration of the information processing apparatus 10 according to the present embodiment has been hereinabove explained. Subsequently, a functional configuration of the information processing apparatus 10 will be explained with reference to FIG. 3. In the explanation below, the functional configuration of the control unit (CPU 104) of the information processing apparatus 10 will be explained. FIG. 3 is a block diagram illustrating a functional configuration of a control unit of the information processing apparatus 10.

As shown in FIG. 3, the control unit of the information processing apparatus 10 includes a detection unit 112, an obtaining unit 114, a storage unit 116, a determining unit 118, and the like. The detection unit 112 has a function of detecting operation performed with the manipulating object on the display screen (not shown) for connecting to one or more apparatuses. In this case, the display screen has the function of the touch panel 102 serving as the input unit as described above and the function of the LCD serving as the display device 106.

Figure 4:
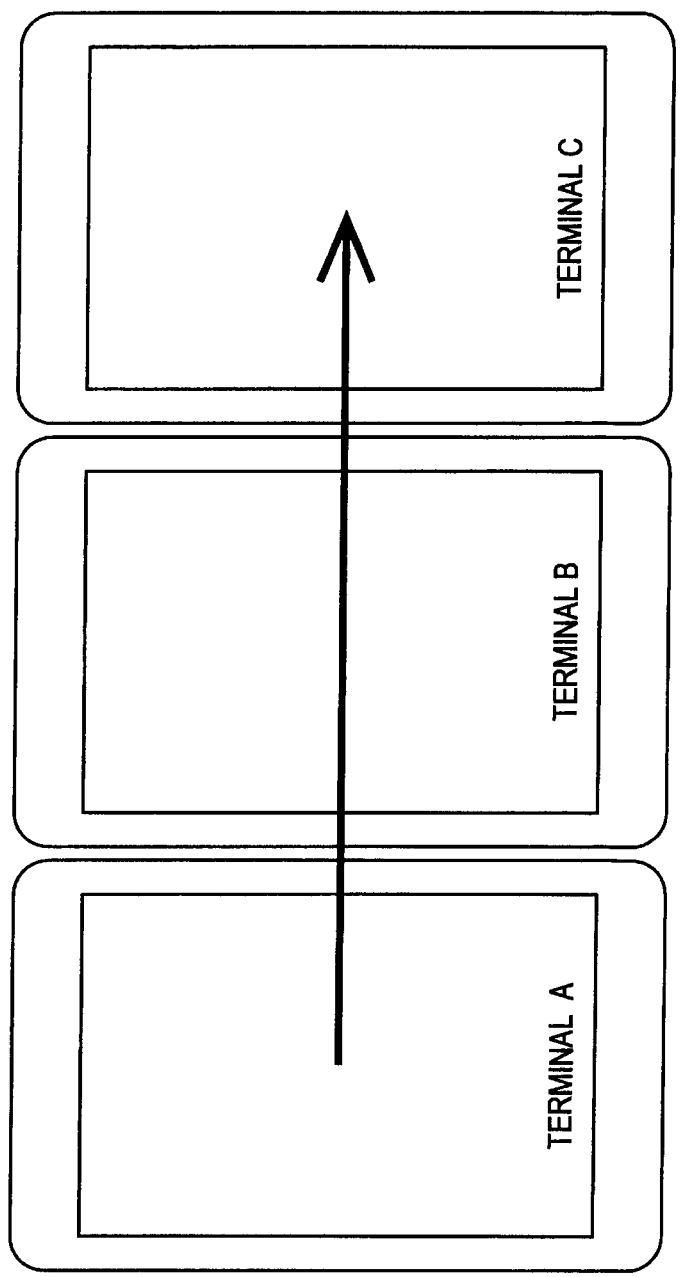
FIG. 4 is an explanatory diagram illustrating a trail of operation performed with a manipulating object according to the embodiment.

Further, the detection unit 112 has a function of detecting a trail of operation performed with the manipulating object. Now, the trail of operation performed with the manipulating object, which is detected by the detection unit 112, will be explained with reference to FIG. 4. In the explanation below, operation is performed to connect the information processing apparatus 10 with two other apparatuses. In FIG. 4, the information processing apparatus 10 is referred to as a terminal A, and the two other apparatuses are respectively referred to as a terminal B and a terminal C.

In the explanation below, three terminals, i.e., the terminals A, B, C, are connected as shown in FIG. 4. In connection operation, a user arranges the terminals to be connected side by side, and performs operation as if to make a continuous line across the display screens. As shown by an arrow in FIG. 4, the user performs input operation using a finger (manipulating object) and the like onto the touch panel, starting from the terminal A, passing through the terminal B, and to the terminal C.

Further, the detection unit 112 detects an input start region at which input operation performed with the manipulating object to the display screen is started and an input end region at which the input is finished. Further, the detection unit 112 detects an input start time when input operation performed with the manipulating object to the display screen is started and an input end time when the input is finished. The detection unit 112 virtually divides the touch panel 102 into predetermined regions, and detects one of the divided regions where a trail input is started and one of the divided regions where the trail input is finished.

Figure 5:
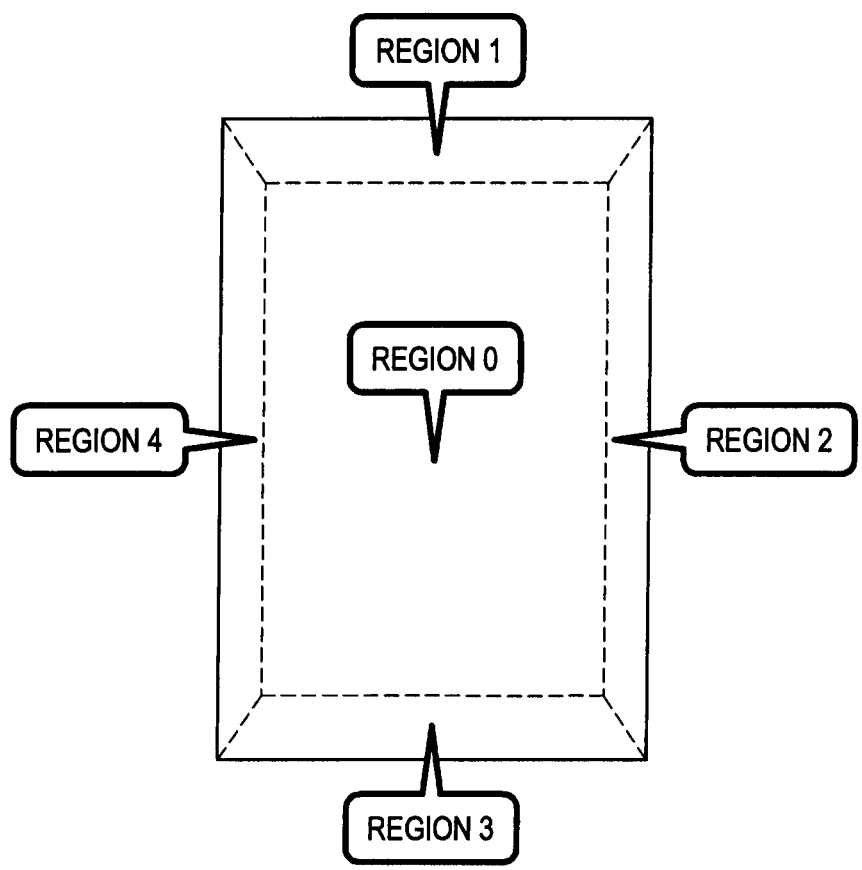
FIG. 5 is an explanatory diagram illustrating divided regions of a touch panel according to the embodiment.

The virtually divided regions on the touch panel 102 will be explained with reference to FIG. 5. As shown in FIG. 5, for example, the touch panel 102 is virtually divided into five regions. A central portion of the touch panel 102 is defined as a region 0. An upper side of the region 0 is defined as a region 1. A right side thereof is defined as a region 2. A lower side thereof is defined as a region 3. A left side thereof is defined as a region 4. For example, when the user performs a trail input with the manipulating object as shown in FIG. 4, the terminal A determines that an input start region where the input performed with the manipulating object is started is "region 0", and an input end region where the input is finished is "region 2".

Likewise, the terminal B determines that an input start region is "region 4", and an input end region is "region 2". On the other hand, the terminal C determines that an input start region is "region 4", and an input end region is "region 0". In addition, each apparatus detects an input start time when the input is started and an input end time when the input is finished. In FIG. 5, the touch panel 102 is divided into the five regions, and each terminal detects which region includes the input start position and the input end position of operation of the manipulating object. However, the present embodiment is not limited thereto. For example, in addition to the center, upper, lower, right, and left regions, the touch panel 102 may be further divided into diagonally upper and diagonally lower regions.

In the explanation of the present embodiment, the terminal to which the information processing apparatus 10 connects is considered to have the same size and shape as the information processing apparatus 10 as shown in FIG. 4. However, the present embodiment is not limited thereto. For example, the thickness of the terminal may be different. In this case, the sizes of the divided regions as shown in FIG. 5 may be changed in view of the thickness of the terminal. For example, when the thicknesses of the terminals connected secondly and thirdly are thicker than the thickness of the other terminal, there is an issue in that when the user touches and moves the finger across the display screens of multiple terminals arranged side by side, an input start position may not be determined to be the region 4 but is determined to be the region 0. To solve this issue, the region 4 may be enlarged, so that a trail input can be correctly detected. Even when the sizes of the display screens are different, or the positions of the display screens of the terminals are different, the sizes of divided regions may be changed, or the display screens may be further divided into smaller regions, whereby a trail input can be correctly detected.

Reference is made back to FIG. 3. The obtaining unit 114 has a function of obtaining trail data representing a trail of operation of the manipulating object which is detected by the terminal in question and the other terminals. The detection unit 112 detects a trail of operation for making a continuous line across the display screens of the terminals A, B, C as shown in FIG. 4. Then, each terminal detects the input start region, the input end region, the input start time, and the input end time. Therefore, the obtaining unit 114 obtains trail data including the input start region, the input end region, the input start time, and the input end time, which are detected by the terminal in question and the other terminals.

The storage unit 116 has a function of storing the trail data obtained by the obtaining unit 114 in a storage medium such as a RAM. For example, the storage unit 116 stores a trail start data table including input start times and input start regions in association with each other, and also stores a trail end table including input end times and input end regions in association with each other.

The determining unit 118 has a function of determining a relative arrangement with respect to the other apparatuses when a connection is established with the other apparatuses based on operation of the manipulating object detected by the detection unit 112. For example, when the detection unit 112 determines that the input start region is the region 0, the terminal A is determined to be a starting point of trail data. Accordingly, the terminal in question is determined to be a master of Bluetooth (registered trademark) connection with respect to the other terminals. On the other hand, when the input start region is determined to be other than 0, the terminal in question is determined to be a slave of Bluetooth (registered trademark) connection.

In the explanation below, a terminal having data representing a start point of trail data and determined to be a master is called a server. A terminal having data representing an intermediate point of trail data and determined to be a slave is called a client 1. A terminal having data representing an end point of trail data is called a client 2.

The determining unit 118 has a function of determining relative orientations of the other apparatuses to which the information processing apparatus 10 connects, based on operation of the manipulating object detected by the detection unit 112. More specifically, the determining unit 118 sorts trail data in the storage unit 116 in the order of time, and determines whether the storage unit 116 has data of the other apparatuses to which the information processing apparatus 10 connects. The determining unit 118 can determine relative orientations of all the terminals using the trail data of the apparatuses, stored in the storage unit 116, to which the information processing apparatus 10 connects.

As described above, the determining unit 118 can determine whether the information processing apparatus 10 is a terminal having a start point of input data or not by dividing trail data given with the manipulating object into the regions as shown in FIG. 5 and detecting regions to which input is given, without communicating with the other apparatuses. In addition, the determining unit 118 can determine a relative orientation of an adjacent terminal based on trail data detected by the terminal in question and the other terminals. In the explanation below, information representing a relative orientation with respect to another apparatus may be referred to as data representing relationship of adjacency.

4. Details of Operation of Information Processing Apparatus

Figure 6:
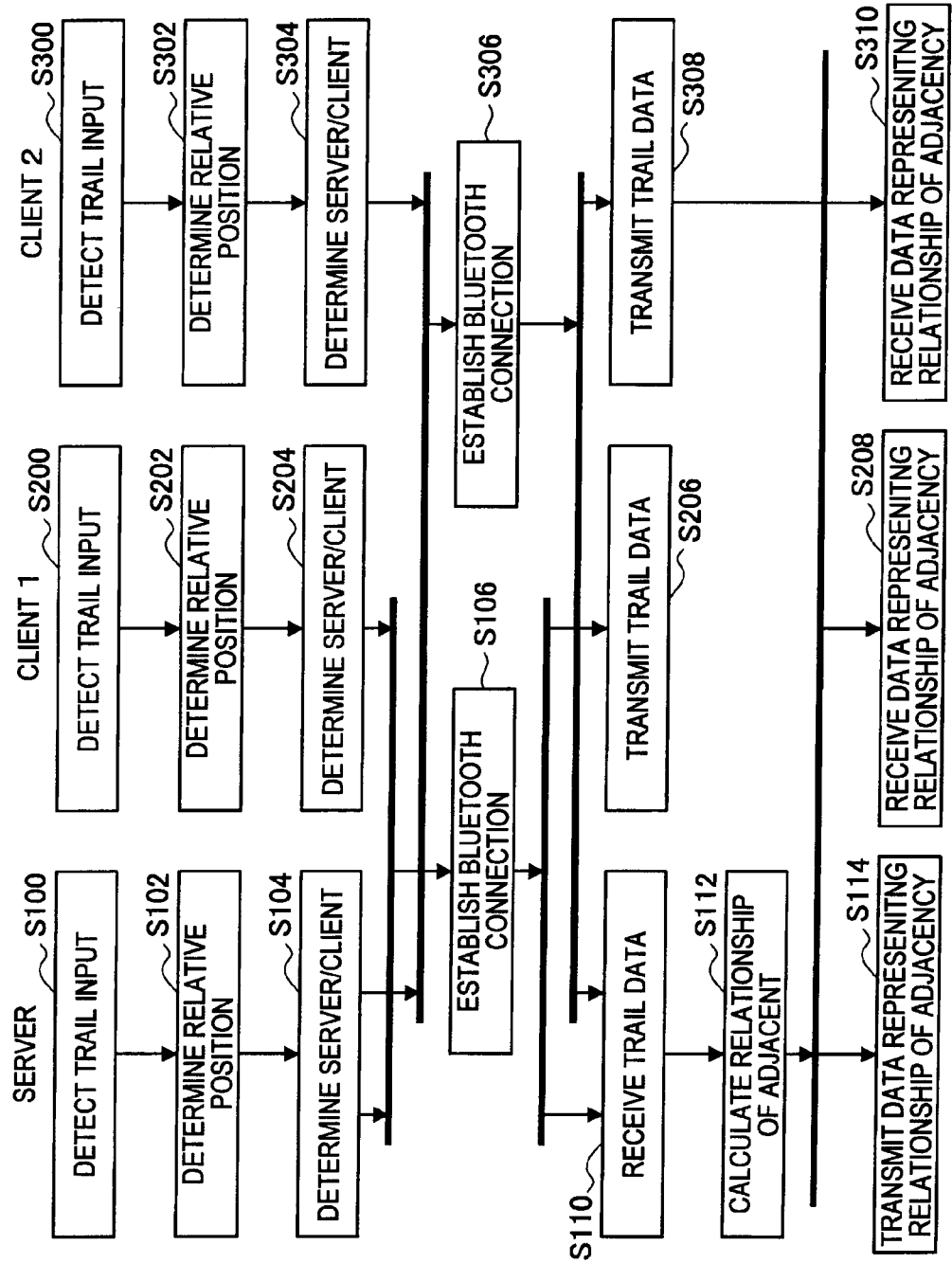
FIG. 6 is an explanatory diagram illustrating an overview of operation of the information processing apparatus according to the embodiment and the other apparatuses.

The functions of the control unit of the information processing apparatus 10 have been explained. Subsequently, the details of operation of the information processing apparatus 10 and the other apparatuses to which the information processing apparatus 10 connects will be explained with reference to FIGS. 6 to 15. In the explanation below, the information processing apparatus 10 is applied to a server serving as a start point of a trail input. FIG. 6 is an explanatory diagram illustrating an overview of operation of the information processing apparatus 10 and the other apparatuses.

As shown in FIG. 6, in the explanation below, one server and two clients are connected. As described above, when operation of the manipulating object is detected using the touch panel, input data detected by the touch panel of each terminal will be referred to as trail input in the explanation below.

First, a user performs connection interaction on the display screens with the manipulating object so as to connect to the other apparatuses, and the detection unit 112 detects trail inputs (S100, S200, S300). Then, the detection unit 112 determines whether each terminal is a server, a client 1, or a client 2 based on the detected trail inputs (S102, S202, S302).

Then, Bluetooth (registered trademark) connections are successively established between the server (master) and the clients (slaves) (S106, S306). In the explanation below, Bluetooth (registered trademark) is used to connect multiple terminals as an example of wireless communication for connecting the multiple terminals. However, the present embodiment is not limited thereto. Wi-Fi, short-range wireless communication, and the like may be used.

After Bluetooth (registered trademark) connection is established, the client 1 and the client 2 transmits trail data representing a trail of operation of the manipulating object to the server (S206, S308). The server receives trail data from each client (S110). Every time the server receives trail data from each client, the server stores trail data. Until the server obtains all the trail data from all the clients to which the server connects, the server calculates relationship of adjacency of all the terminals (S112).

Then, when the server obtains all the trail data from the clients, the server terminates calculation of relationship of adjacency of all the terminals, and stores data representing relationship of adjacency. Then, the server transmits the same data representing relationship of adjacency of all the terminals to the clients (S114). On the other hand, each client receives the data representing relationship of adjacency from the server (S208, S310). Therefore, each terminal can obtain the relationship of adjacency of all the terminals to which the terminal connects.

Figure 7:
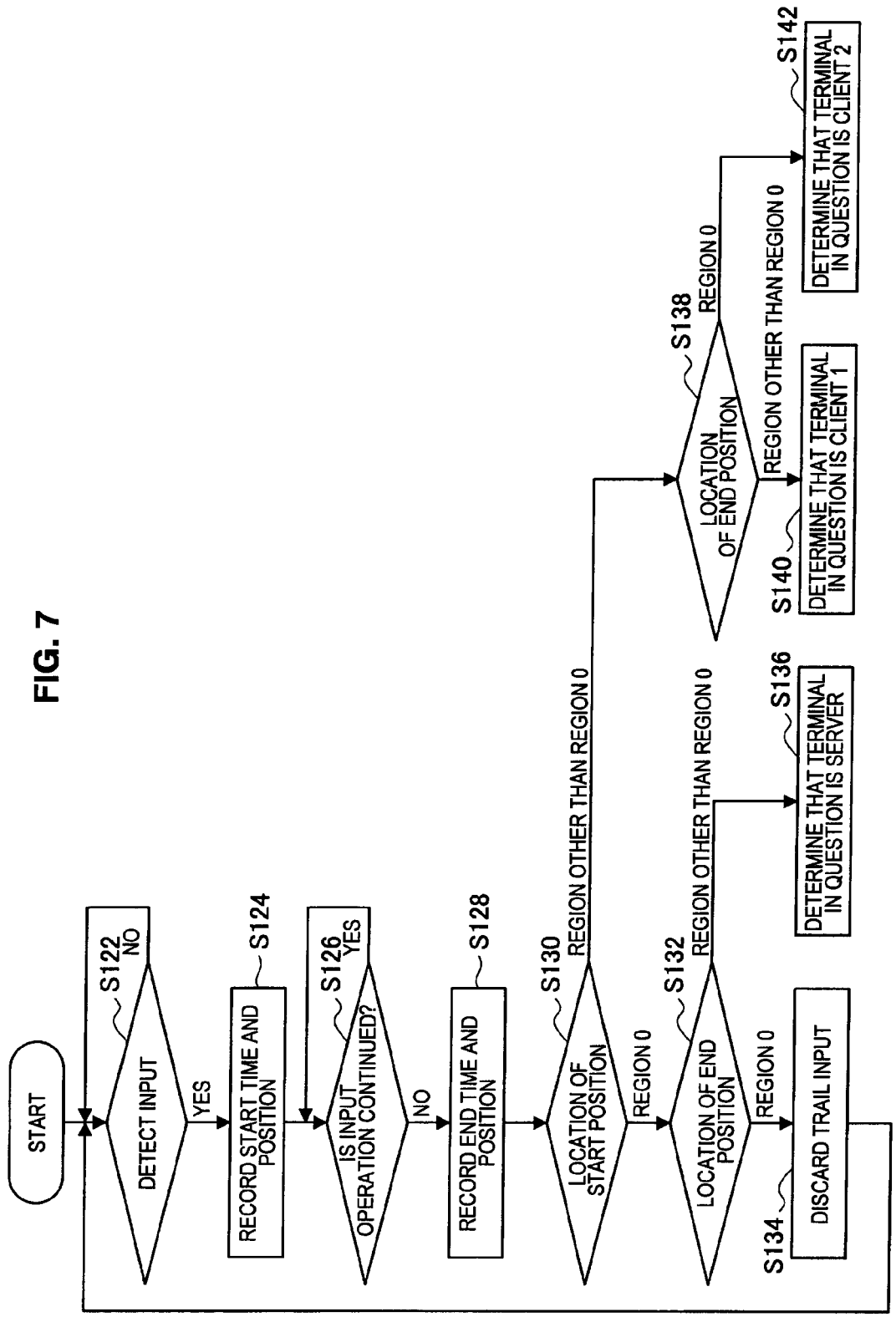
FIG. 7 is a flowchart illustrating the details of relative position determination processing according to the embodiment.

The overview of operation of the information processing apparatus 10 and the other apparatuses have been explained hereinabove. Subsequently, the details of the relative position determination processing (S102, S202, S302) of FIG. 6 will be explained. The relative position determination processing performed by each terminal is the same. As shown in FIG. 7, first, a determination is made as to whether a trail input has been detected or not (S122). When a trail input is determined to have been detected in step S122, a start time (input start time) and a position (input start region) of the trail input are recorded (S124).

Then, a determination is made as to whether the input performed with the manipulating object is continued or not (S126). When the input performed with the manipulating object is determined not to be continued in step S126, an end time (input end time) and a position (input end region) of the trail input are recorded (S128). Then, a determination is made as to which of the regions shown in FIG. 5 includes the input start position recorded in step S124 (S130).

When the input start position is determined to be included in the region 0 in step S130, a determination is made as to which of the regions shown in FIG. 5 includes the input end position (S132). When the input end position is determined to be included in the region 0 in step S132, the trail input is discarded because this is not operation for connecting the terminal (S134). When the input end position is determined to be included in a region other than the region 0 in step S132, the terminal in question is determined to be the server (S136).

When the input start position is determined to be included in a region other than the region 0 in step S130, a determination is made which of the regions shown in FIG. 5 includes the input end position (S138). When the input end position is determined to be included in a region other than the region 0 in step S138, the terminal in question is determined to be the client 1 (S140). When the input end position is determined to be included in the region 0 in step S138, the terminal in question is determined to be the client 2 (S142).

Figure 8:
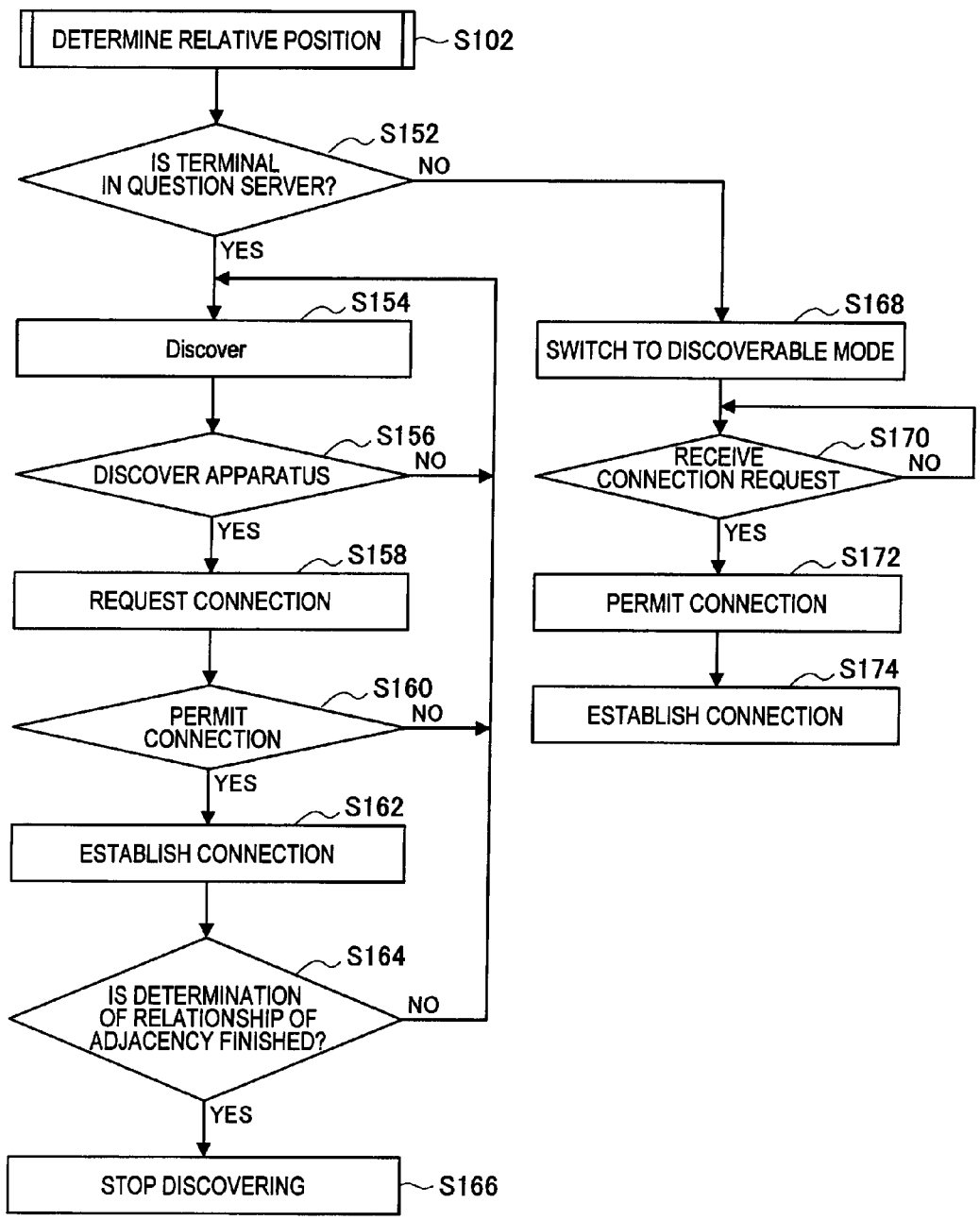
FIG. 8 is a flowchart illustrating processing for establishing a network according to the embodiment.

Subsequently, server/client determining processing and Bluetooth Connection-establishing processing will be explained with reference to FIG. 8. First, a determination is made as to whether the terminal in question is the server or not (S152). When the terminal in question is determined to be the server in step S152, discover processing is executed to discover other apparatuses (S154). When another apparatus is determined to have been found in step S154, the terminal in question requests connection to the another apparatus thus found (connection request) (S158).

Then, a determination is made as to whether the another apparatus has permitted connection (connection permission) or not (S160). When the connection is determined to be permitted in step S160, connection with the another apparatus is established (connection establishment) (S162). Then, a determination is made as to whether the determination of the relationship of adjacency has been finished or not (S164). The process for determining the relationship of adjacency in step S164 will be explained later in detail. When the determination of the relationship of adjacency is determined to have been finished in step S164, the discover processing is terminated (S166).

When the terminal in question is determined not to be the server in step S152, the mode is switched to the discoverable mode (S168). Then, a determination is made as to whether a connection request has already been received from the terminal serving as the server (S170). When it is determined that the connection request is determined to have been received from the server in step S170, the connection is permitted, and the connection with the server is established (S174).

Figure 9:
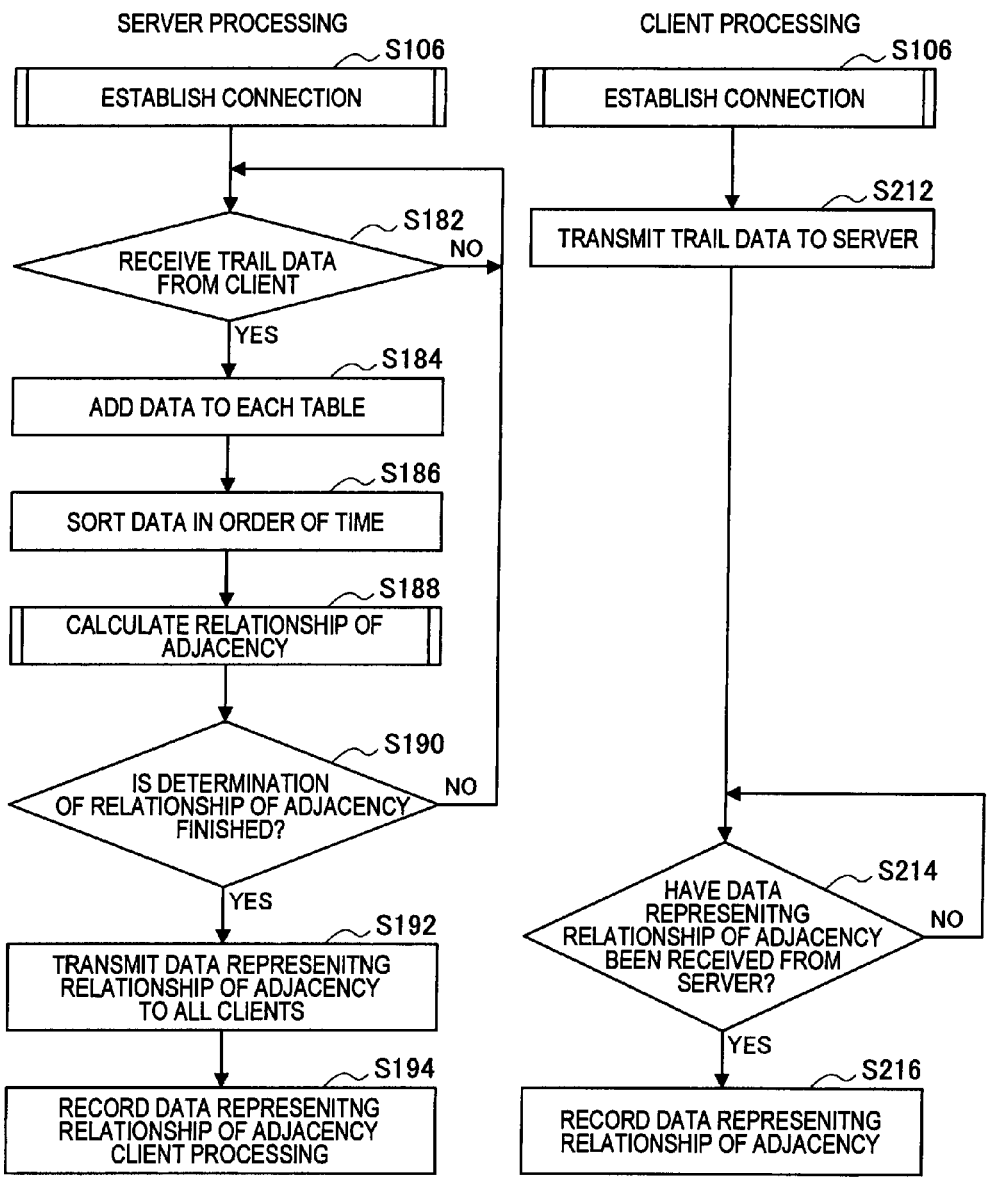
FIG. 9 is a flowchart illustrating data transmission/reception processing according to the embodiment.

Subsequently, transmission/reception of trail data and transmission/reception processing of data representing relationship of adjacency will be explained. As shown in FIG. 9, after the connection with the client is established, the server determines whether the server has received trail data from the client (S182). When the trail data is determined to have been received from the client in step S182, the received trail data are added to a table (S184). In step S184, the input start time and the input start region of the received trail data are associated with each other and are added to the trail start data table, and the input end time and the input end region are associated with each other and are added to the trail end data table.

Figure 10:
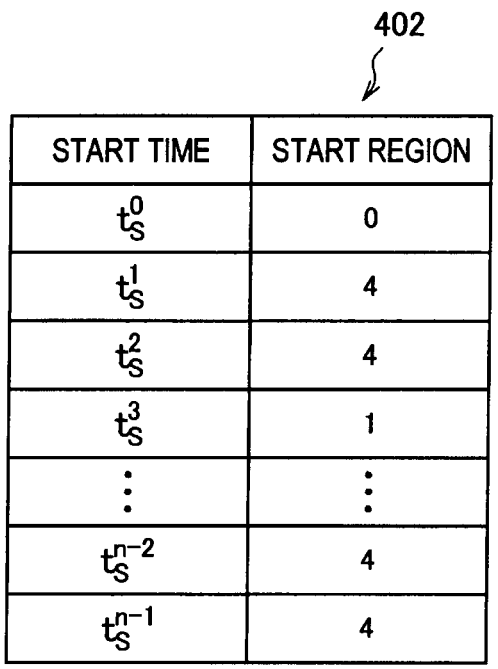
FIG. 10 is an explanatory diagram for explaining the contents of a trail start table according to the embodiment.
Figure 11:
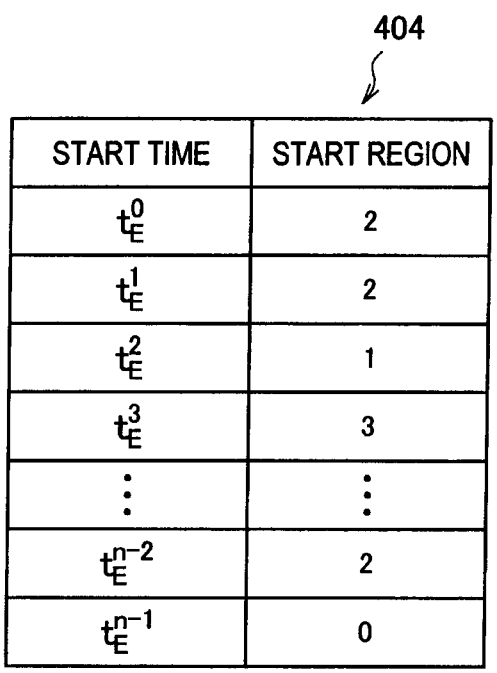
FIG. 11 is an explanatory diagram for explaining the contents of a trail end table according to the embodiment.

FIG. 10 illustrates an example of the trail start data table. FIG. 11 illustrates an example of the trail end data table. In FIGS. 10 and 11, the number of terminals having established Bluetooth Connection, i.e., the number of terminals having finished connection, is denoted with n. In the explanation below, the number of terminals having finished connection (the number of lines in the data table) is denoted with n, and the number of terminals on which a user has performed connection interaction (the number of terminals which the user wants to connect) is denoted with N.

Then, the data in the trail start data table in FIG. 10 and the data in the trail end data table in FIG. 11 are sorted (arranged) in the order of time (S186). After the data are sorted in step S186, the relationship of adjacency is calculated (S188). The processing for calculating the relationship of adjacency in step S188 will be explained later in detail.

Then, a determination is made as to whether the determination of the relationship of adjacency is finished or not (S190). When the determination of the relationship of adjacency is determined to have been finished in step S190, the data representing relationship of adjacency are transmitted to all the clients (S192). In this case, the data representing relationship of adjacency is a data table having records for all the terminals, each including a number for identifying a terminal and a position of the terminal within an input trail. Then, the transmitted data representing relationship of adjacency is recorded in step S192 (S194).

On the other hand, after the connection with the server is established, the client transmits trail data detected by the client to the server (S212). Then, a determination is made as to whether the data representing relationship of adjacency calculated by the server has been received or not (S214). When the data representing relationship of adjacency is determined to have been received from the server in step S214, the received data representing relationship of adjacency is recorded (S216).

Subsequently, the details of the server's processing for calculating the relationship of adjacency in step S188 of FIG. 9 will be explained. There are two ways explained below for the server to calculate the relationship of adjacency.

(A) The number of terminals N which the user wants to connect is already known based on input given by the user
(B) The number of terminals N is unknown First, the processing for calculating the relationship of adjacency in the above case (A) where the number of terminals N is already known will be explained. In the case (A), the number of terminals N is already known. Therefore, when the number of lines n in each data table shown in FIGS. 10 and 11 becomes equal to the number of terminals N, it is determined that all the trail data for the adjacent terminals have been obtained. When all the trail data for the adjacent terminals have been obtained, the server determines that the server is ready to determine the relationship of adjacency of all the terminals.

Figure 12:
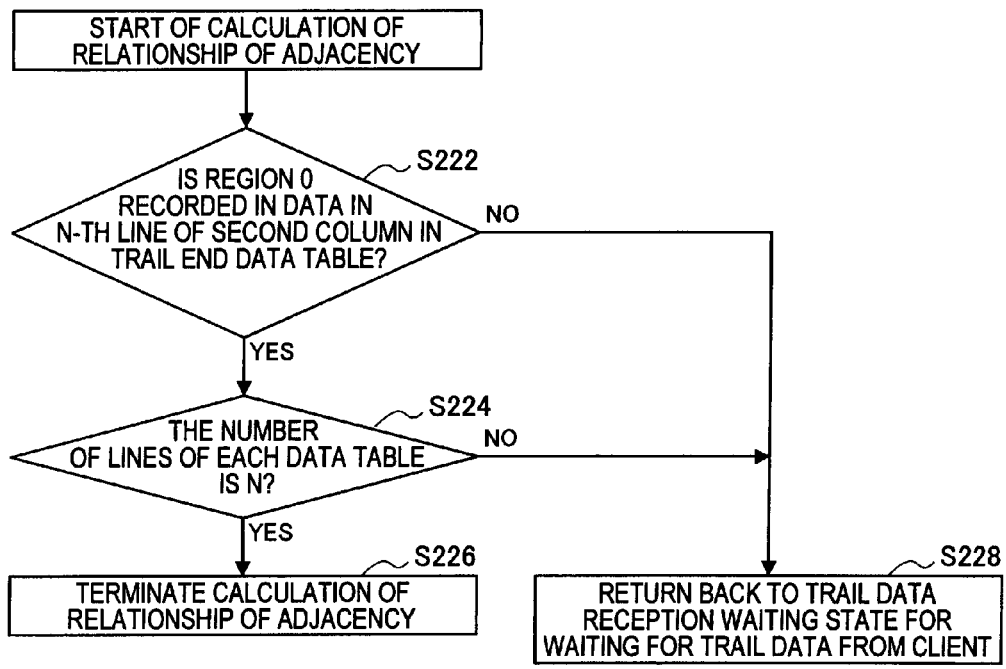
FIG. 12 is a flowchart illustrating processing for calculating relationship of adjacency according to the embodiment.

FIG. 12 illustrates the processing for calculating the relationship of adjacency in a case where the number of terminals N is already known. As shown in FIG. 12, the data of the trail start data table and the trail end data table are sorted in the order of time, and thereafter, a determination is made as to whether data in the n-th line of the second column in the trail end data table has the region 0 or not (S222). When the data in the n-th line of the second column in the trail end data table has the region 0, this means that the data in the last line of the trail end data table indicates data representing the end of the trail input.

When the region 0 is determined to be recorded in the data in the n-th line of the second column in the trail end data table in step S222, a determination is made as to whether the number of lines in each data table is N or not (S224). When the region 0 is determined not to be recorded in the data in the n-th line of the second column in the trail end data table in step S222, the server goes back to a trail data reception waiting mode so as to wait for trail data transmitted from the client (S228).

When the number of lines in each data table is N in step S224, data corresponding to the number of terminals N have been transmitted to the server. When the number of lines in each data table is determined to be N in step S224, the calculation of the relationship of adjacency is terminated (S226). When the number of lines in each data table is determined not to be N in step S224, the server goes back to the trail data reception waiting mode so as to wait for trail data transmitted from the client (S228).

Subsequently, the case (B) where the number of terminals N is unknown will be explained. In the case where the number of terminals N is unknown, the following two determination methods can be shown as examples.

(B-1) Determination of relationship of adjacency is distinguished by controlling connection-establishing speed and timing of Bluetooth connection so as to successively finish connection of adjacent terminals and thereafter finish connection of other terminals in order by devising a GUI display used for connection interaction.

(B-2) Determination of whether relationship of adjacency can be distinguished by using a fixed threshold value for a display-crossing time without relying on the order of connection establishment.

Figure 13:
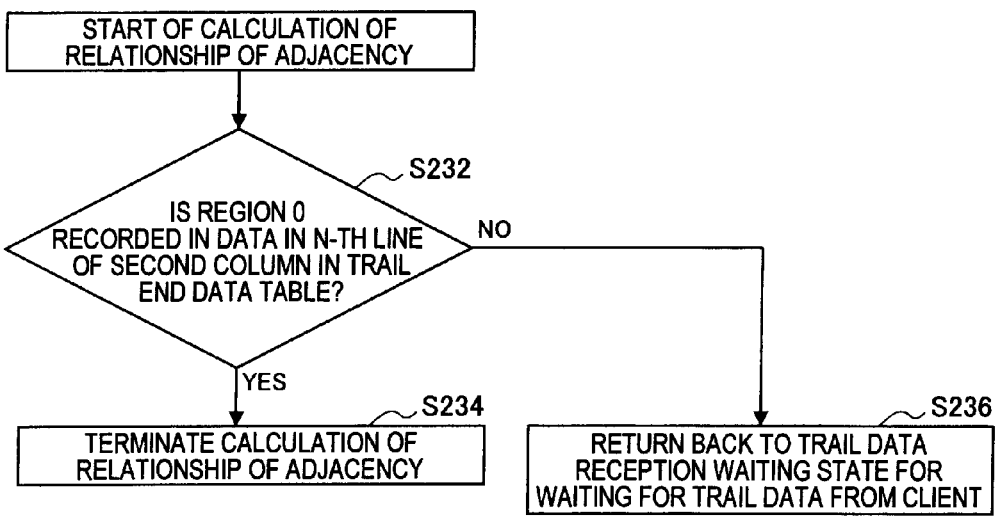
FIG. 13 is a flowchart illustrating processing for calculating relationship of adjacency according to the embodiment.

The above case (B-1) will be explained. In the case (B-1), the determining processing shown in FIG. 13 is executed by controlling the above connection establishing speed and timing using connection interaction. For example, if a connection is not established when Bluetooth Connection is established, the control of the connection interaction notifies the user by displaying, on the screen, a message indicating that the trail input to the touch panel is not to be executed continuously. As a result, the trail input to the touch panel can be performed while successively establishing connection of the terminals connected by the user. As described above, connection is established in the order of the trail input. Therefore, when connection is established to the terminal having the trail input end point, i.e., the client 2, it is determined that it is ready to determine the relationship of adjacency of all the terminals.

As shown in FIG. 13, in the case (B-1), the data of the trail start data table and the trail end data table are sorted in the order of time, and thereafter, a determination is made as to whether the region 0 is recorded in data in the n-th line of the second column in the trail end data table (S232). When the region 0 is determined to be recorded in the data in the n-th line of the second column in the trail end data table in step S232, the calculation of the relationship of adjacency is terminated (S234). When the region 0 is determined not to be recorded in the data in the n-th line of the second column in the trail end data table in step S232, the server goes back to the trail data reception waiting mode so as to wait for trail data transmitted from the client (S236).

Figure 14:
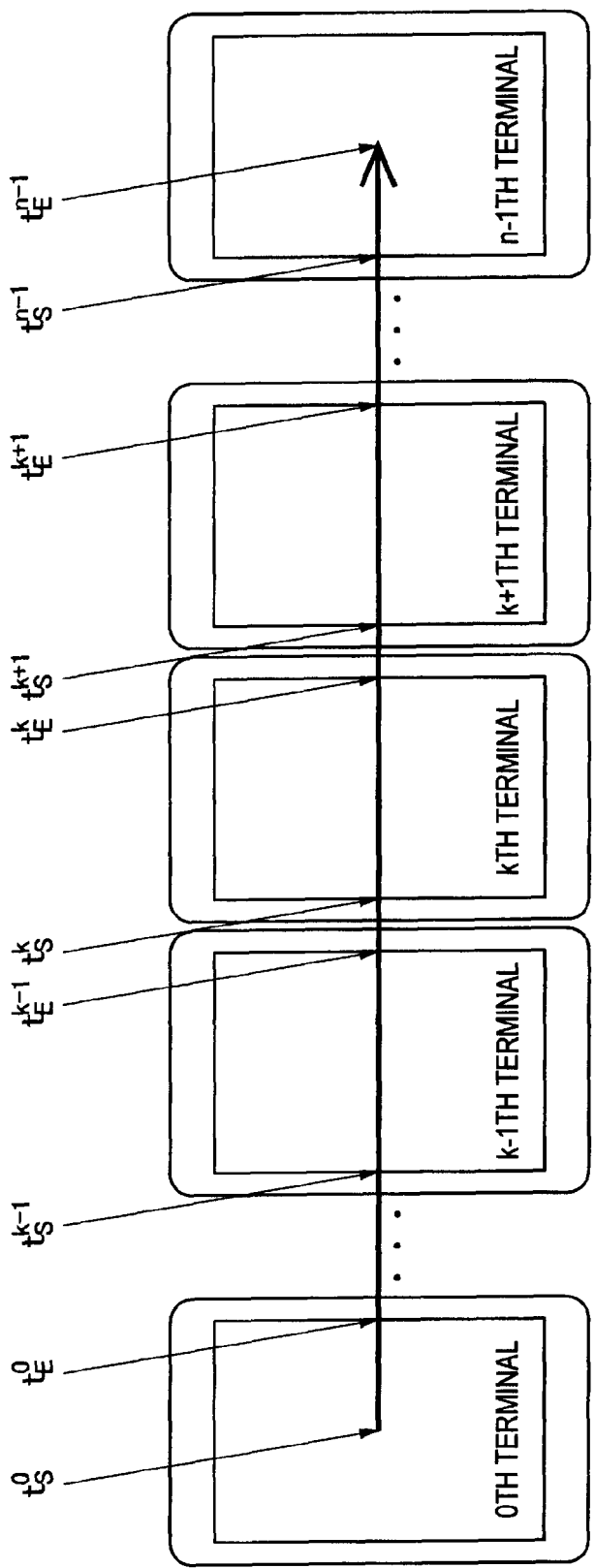
FIG. 14 is an explanatory diagram illustrating relationship between a plurality of terminals according to the embodiment.

Subsequently, the above case (B-2) will be explained. In the case (B-2), the number of terminals N is unknown. Therefore, a determining condition for determining whether it is possible to determine the relationship of adjacency of all the terminals is necessary in place of the condition in which the number of lines n in the data table is equal to N. The determining condition is such that, when the plurality of terminals satisfy the relationship as shown in FIG. 14, the following condition 1 is satisfied, and that the connection to the terminal (client 2) having the trail input end point is established.

$T_{stride}$: display-crossing time $T^k_{stride} = t^k_S - t^{k-1}_B (k=1,2 \ldots n-1)$ $T^l_{compare} = t^k_S - t^l_B (l=0,1,2 \ldots k-1)$ where k is equal to or more than 1

$T^k_{stride} \leq T^l_{compare} (l=1,2 \ldots k-1)$  (Condition 1)

Figure 15:
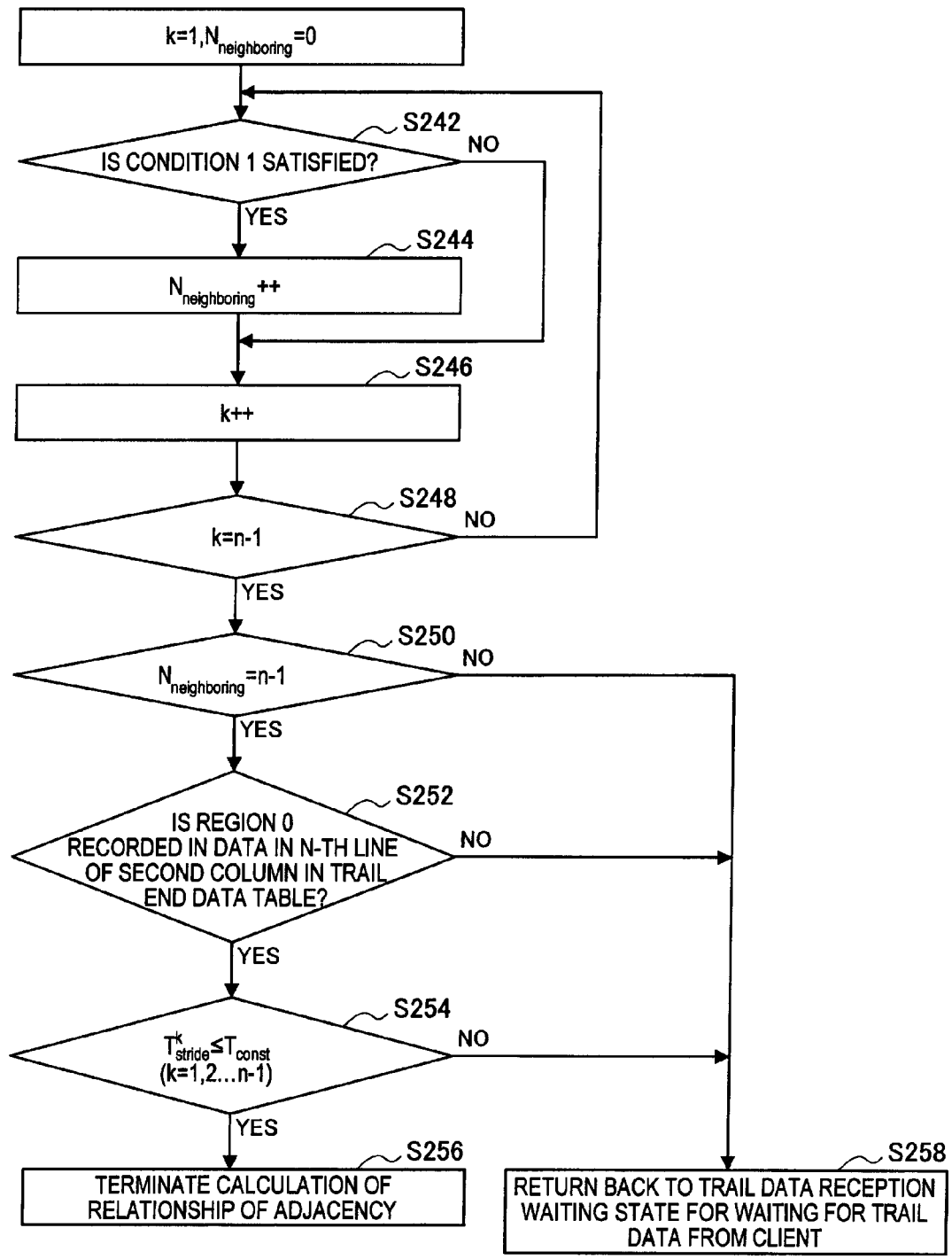
FIG. 15 is a flowchart illustrating processing for calculating relationship of adjacency according to the embodiment.

In the above condition 1, a time difference between an entrance time to a certain terminal and an exit time from a terminal having completed connection earlier than the certain terminal is calculated for each terminal to which Bluetooth Connection is established, and the condition 1 is satisfied if a time difference between the entrance time and the exit time from an adjacent terminal is the minimum in the data table. The processing of the case (B-2) will be explained with reference to FIG. 15. In FIG. 15, the following initial values are set: k=1, $N_{neighboring}$=0. $N_{neighboring}$ is the number of terminals whose relationship of adjacency has already been determined.

As shown in FIG. 15, first, a determination is made as to whether the above condition 1 is satisfied or not (S242). When the above condition 1 is determined to be satisfied in step S242, $N_{neighboring}$ is increased by one (S244). When the condition 1 is determined not to be satisfied in step S242, the processing of step S246 is executed.

Then, k is increased by one (S246), a determination is made as to whether k=n−1 is satisfied or not (S248). In this case, n is the number of lines in the data table. When it is determined that k=n−1 is not satisfied in step S248, the processing of step S242 is subsequently executed. When it is determined that k=n−1 is satisfied in step S248, a determination is made as to whether $N_{neighboring}$=n−1 is satisfied or not (S250). When it is determined that $N_{neighboring}$=n−1 is satisfied in step S250, a determination is made as to whether the data in the n-th line of the second column in the trail end data table has the region 0 or not (S252). When it is determined that $N_{neighboring}$=n−1 is not satisfied in step S250, the server goes back to the trail data reception waiting mode so as to wait for trail data transmitted from the client (S258).

When the region 0 is determined to be recorded in the data in the n-th line of the second column in the trail end data table in step S252, a determination is made as to whether the following conditional expression 2 is satisfied or not (S254).

$T^k_{stride} \leq T_{const} (k=1,2 \ldots n-1)$  (Conditional Expression 2)

$T_{const}$: standard display-crossing time defined in advance

When the region 0 is determined not to be recorded in the data in the n-th line of the second column in the trail end data table in step S252, the server goes back to the trail data reception waiting mode so as to wait for trail data transmitted from the client (S258). When the conditional expression 2 is determined to be satisfied in step S254, the calculation of the relationship of adjacency is terminated (S256). When the conditional expression 2 is determined not to be satisfied in step S254, the server goes back to the trail data reception waiting mode so as to wait for trail data transmitted from the client (S258).

Figure 16:
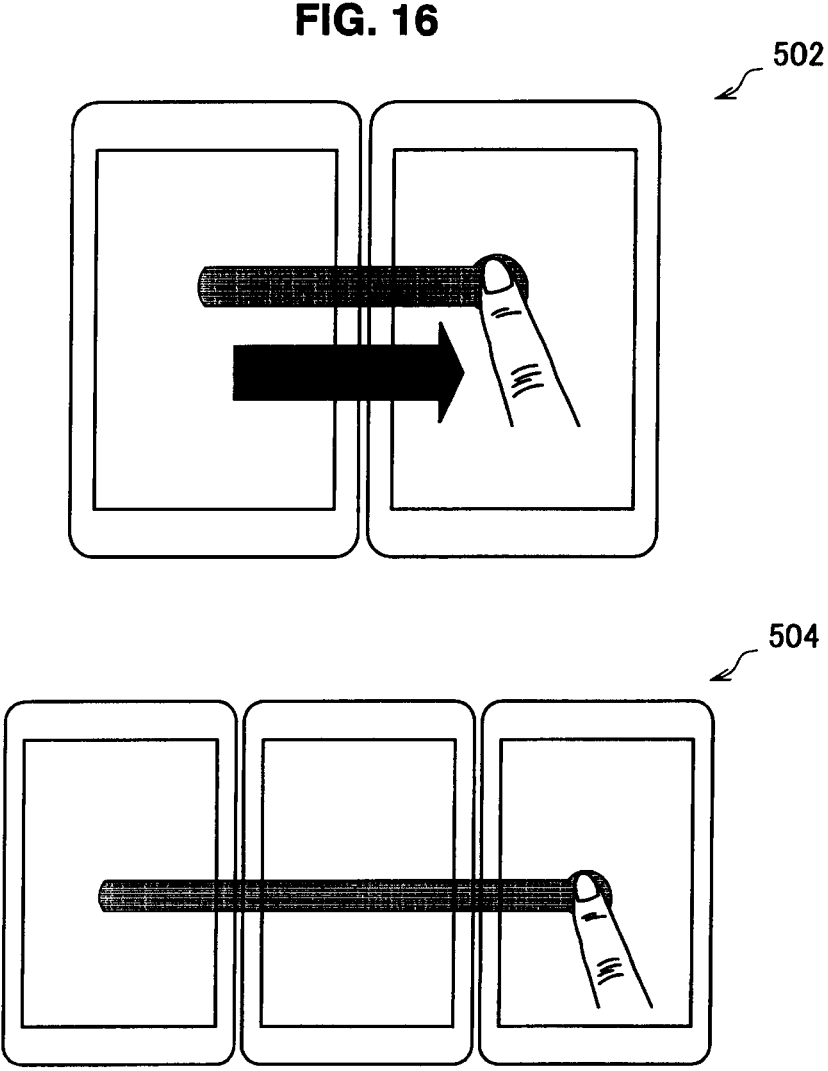
FIG. 16 is an explanatory diagram illustrating an input of a trail according to the embodiment.

The details of operation of the information processing apparatus 10 according to the present embodiment has been explained hereinabove. Subsequently, the trail input detected in steps S100, S200, S300 will be explained with reference to FIG. 16. FIG. 16 is an explanatory diagram for describing the connection operation between the terminals performed with the manipulating object. In FIG. 16, detection of operation performed with the manipulating object on the touch panel will be explained.

As shown in an explanatory diagram 502 of FIG. 16, when two terminals are connected, the two terminals are arranged side by side, and a user performs input by drawing, with the manipulating object, a line on the display screens across the two terminals. Alternatively, when the line shown in the explanatory diagram 502 is displayed on the display screen, the user may trace the line.

Still alternatively, the user may perform flick operation on the display screens from the left terminal to the right terminal which are arranged side by side as shown in the explanatory diagram 502, and thereafter, continuously perform flick operation on the display screens from the right terminal to the left terminal. In this manner, the same input as the input given by drawing one line on the display screens may be achieved by performing continuous flick operations.

When three or more terminals are connected as shown in the explanatory diagram 504, the three terminals are arranged side by side, and the user performs an input by drawing one line across the three display screens at a time. In some cases, as shown in the explanatory diagram 506, three or more terminals may be placed at positions as desired by the user, and the user may perform input by drawing one line on the display screens across the three terminals. In this way, the user can establish network connection between multiple terminals and perform multicast-like data transfer only by performing intuitive input by drawing one line on the display screens of the multiple terminals.

In a case where the user performs input by drawing one line across the display screens of the terminals as shown in the explanatory diagrams 502, 504 during connection operation, a trail of operation performed with the manipulating object may be displayed before actual connection is established. Therefore, the user can feel a sense of smooth connection.

When the user wants to disconnect a network, the user may perform input by erasing, using a virtual eraser, a line representing network connection on the display screens. When the user performs input by drawing an "X" on the line representing network connection on the display screens, the network connection may be disconnected. As described above, in the present embodiment, the network can be connected and disconnected by intuitive input.

Figure 17A:
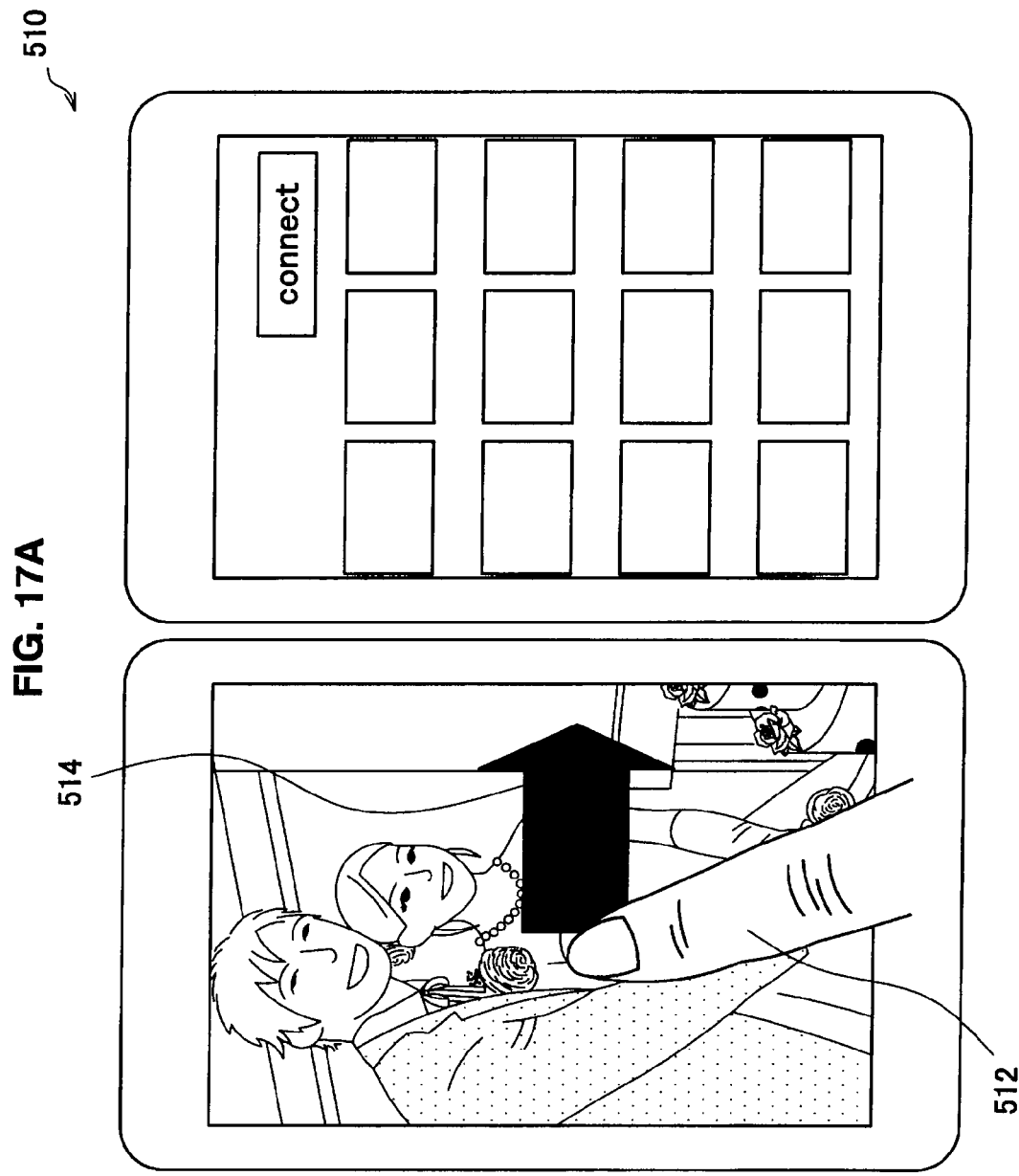
FIG. 17A is an explanatory diagram illustrating data transmission/reception according to the embodiment.

Subsequently, data transmission/reception will be explained with reference to FIGS. 17A and 17B, in a case where the terminals are connected according to the above method, and the relationship of adjacency of the terminals is recognized. In FIG. 17A, image data are transmitted from the terminal on the left to the terminal on the right. In FIG. 17A, the user causes the manipulating object such as a finger to press and move, in the arrow direction, on the display screen displaying an image which is to be transferred. While the manipulating object is pressed and moved in the arrow direction on the image, the image displayed on the display screen moves in the arrow direction (transfer direction) little by little. Then, when the manipulating object is pressed against the image for a predetermined time or more, transfer of the image data may be executed. For example, when a long tap for a predetermined time or more is executed with a finger serving as the manipulating object, the image data may be transferred.

When the image data are transferred from the terminal on the right side to the terminal on the left side as shown in FIG. 17B, the image may be displayed in such a manner that the image is slid into the screen of the terminal on the left from the terminal on the right, i.e., a source of transfer. On the display screen of the destination terminal, the image size may be changed according to the screen size of the destination terminal. On the destination terminal, the image may be displayed in the same size as the screen size after a user performs a certain operation with the manipulating object. In this case, the operation with the manipulating object may be, for example, tapping the display screen.

As described above, since the relationship of adjacency of the terminals is recognized, the direction of the destination terminal can be identified, and data can be transferred to a terminal located in a desired direction by intuitive input. Further, intuitive operational feeling can be achieved by devising a display method of data to be transferred.

When network connection is established and thereafter data transfer is performed, a connection level of a terminal may be selected according to connection input of the manipulating object, and data transfer range may be selected according to the connection level.

For example, as shown in FIG. 18A, a connection level may be changed according to whether a line is drawn with one finger or two fingers. In the explanatory diagram 532, a line is drawn with one finger across two terminals. When the line is drawn with one finger in this manner, a low connection level is selected. In the explanatory diagram 534, a line is drawn with two fingers across two terminals. When the line is drawn with two fingers in this manner, a high connection level is selected.

As shown in FIG. 18B, a connection level may be selected on a GUI including a selection screen displayed on the display screen of the terminal from which a trail input is started. In the explanatory diagram 542, the GUI including selection levels is displayed on the terminal, from which a trail input is started. In the explanatory diagram 542, a display region including "level 1" on the display screen is a start position of a trail input. In this case, level 1 is selected as the connection level. On the other hand, in the explanatory diagram 544, a display region including "level 3" on the display screen is a start position of a trail input. In this case, level 3 is selected as the connection level.

As shown in FIGS. 18A and 18B, when a connection level is selected according to user operation, data are transferred with the selected connection level. For example, when "level 1" is selected as the connection level, only landscape pictures are transferred. When "level 2" is selected as the connection level, not only landscape pictures but also pictures of people may be transferred. When "level 3" is selected as the connection level, enlarged pictures of faces may also be transferred. Therefore, the quality and types of contents to be transferred may be changed according to the connection level.

It should be understood by those skilled in the art that various modifications, combinations, sub-combinations and alterations may occur depending on design requirements and other factors insofar as they are within the scope of the appended claims or the equivalents thereof.

For example, the steps of the processings performed by the information processing apparatus 10 may not be performed in a time-series according to the order described in the flowchart. For example, the steps of the processings performed by the information processing apparatus 10 of this specification may be performed in a different order from the order described in the flowchart, or may be performed in parallel.

A computer program for causing hardware such as a CPU, a ROM, and a RAM in the information processing apparatus 10 to achieve the same functions as the constituent elements of the information processing apparatus 10 may be generated. In addition, a storage medium storing the computer program is also provided.

The present application contains subject matter related to that disclosed in Japanese Priority Patent Application JP 2010-061126 filed in the Japan Patent Office on Mar. 17, 2010, the entire content of which is hereby incorporated by reference.

What is claimed is:

1. At least one apparatus comprising:
   at least one detection unit configured to perform at least one detecting operation of at least one manipulating object moved across at least two display screens of at least two apparatuses of said at least one apparatus; and
   at least one determining unit configured to determine a function to be performed by said at least two apparatuses, based on a path and number of the at least one manipulating object moved across said at least two display screens detected by the detection unit to establish a user level communication protocol between said at least two apparatuses, wherein:
   said at least one manipulation object comprises multiple fingers on a human hand,
   said function is determined based on the path and number of the manipulating objects comprises to be a first function if one finger is used and a second function if two fingers are used, the first function is moving landscape pictures from one apparatus to another apparatus of said at least one apparatus, and the second function is moving both landscape and people pictures from one apparatus to another of said at least one apparatus.

2. The at least one apparatus according to claim 1, wherein the at least one determining unit determines a relative arrangement of said at least two apparatuses to at least one of establish and confirm the user level communication protocol between said at least two apparatuses, based on the path of the at least one manipulating object detected by at least two detection units of said at least one detection unit.

3. The at least one apparatus according to claim 1, wherein said at least one detection unit detects a trail input on at least one of said at least two display screens according to the operation of the at least one manipulating object.

4. The at least one apparatus according to claim 3, further comprising:

at least one obtaining unit configured to obtain trail data representing the path of the at least one manipulating object detected by said at least one apparatus.

5. The at least one apparatus according to claim 4, further comprising:

at least one storage unit configured to store the trail data obtained by the at least one obtaining unit.

6. The at least one apparatus according to claim 5, wherein the at least one determining unit sorts based on time the trail data stored in the at least one storage unit, and wherein the at least one determining unit of one of the at least two apparatuses determines whether the at least one storage unit of said one of the at least two apparatuses stores data of another apparatus of the at least two apparatuses as part of establishing the user level communication protocol between said at least two apparatuses.

7. The at least one apparatus according to claim 4, wherein the at least one obtaining unit obtains trail start data including the input start region and the input start time and the trail end data including the input end region and the input end time, the trail start data and the trail end data being detected by at least two apparatuses of said at least one apparatus.

8. The at least one apparatus according to claim 7, wherein the at least one storage unit stores the trail start data and the trail end data obtained by the at least one obtaining unit.

9. The at least one apparatus according to claim 8, wherein if the number of apparatuses of said at least one apparatus establishing the user level communication protocol is already known, the determining unit makes a determination as follows:

in the trail start data and the trail end data sorted based on time, the trail end region of the trail end data stored equals the number of apparatuses of said at least one apparatus, and if the number of pieces of stored data corresponds to the number of apparatuses of said at least one apparatus, the at least one determining unit determines that the trail start data and the trail end data are data representing a relative orientation of the at least two apparatuses as part of establishing the user level communication protocol between said at least two apparatuses.

10. The at least one apparatus according to claim 8, wherein if the number of apparatuses of the at least one apparatus establishing the user level communication protocol is unknown, the at least one determining unit makes a determination as follows:

in the trail start data and the trail end data sorted based on time, a time difference between an input start time of a predetermined terminal of said at least one apparatus and an input end time of another terminal of said at least one apparatus is calculated, and if a time difference between the input start time of the predetermined terminal and another input end time whose data are located adjacently is determined to be a minimum and the time difference is equal to or less than a predetermined threshold value, then the determining unit determines that the trail start data and the trail end data are data representing a relative orientation of said at least two apparatuses if the trail end region of the trail end data stored at the last is a region representing an end of the trail input performed with the at least one manipulating object.

11. The at least one apparatus according to claim 1, wherein the at least one detection unit detects an input start region from which input is started and an input end region at which the input is finished, the input being performed with the at least one manipulating object onto at least one of said at least two display screens.

12. The at least one apparatus according to claim 11, wherein the at least one detection unit detects an input start time when input is started and an input end time when the input is finished, the input being performed with the at least one manipulating object onto at least one of said at least two display screens.

13. The at least one apparatus according to claim 1, wherein the detection unit uses at least one of a touch panel of a capacitance method and an infrared method to detect operation performed with the at least one manipulating object on said at least one apparatus.

14. The at least one apparatus according to claim 1, wherein said at least one apparatus is three or more devices.

15. The at least one apparatus of claim 14, wherein the path of the at least one manipulation object is across said at least three devices.

16. The at least one apparatus of claim 1, wherein the user-level communication protocol comprises a transmission and storage of at least one selected data file between said at least two apparatuses for future use of said at least one selected data file.

17. The at least one apparatus of claim 16, wherein said at least one selected data file comprises at least one of:
picture data;
moving picture data;
audio data;
personal identification data;
financial data;
text data; and
security data.

18. The at least one apparatus of claim 17, wherein said computer level communication protocol comprises at least one of:
an infrared communication protocol;
a wireless LAN communication protocol;
a cellular communication protocol; and
short range wireless communication protocol.

19. A method comprising the steps of:
detecting at least one manipulating object on at least two display screens to establish a user level communication protocol between at least two apparatuses; and
determining a function to be performed by the at least two apparatuses, based on a detected path and number of the at least one manipulating object moved across said at least two display screens to establish the user level communication protocol between said at least two apparatuses, wherein:
said at least one manipulation object comprises multiple fingers on a human hand,
said function is determined based on the path and number of the manipulating objects comprises to be a first function if one finger is used and a second function if two fingers are used,
the first function is moving landscape pictures from one apparatus to another apparatus of said at least one apparatus, and
the second function is moving both landscape and people pictures from one apparatus to another of said at least one apparatus.

20. The method of claim 19, where the method is embodied on a non-transitory computer readable medium, which causes the method to be executed in a computer.

\* \* \* \* \*